United States Patent [19]

Hoyt

[11] 4,403,386

[45] Sep. 13, 1983

[54] BOLT TYPE LOCK PULLER

[75] Inventor: Richard E. Hoyt, Worcester, Mass.

[73] Assignee: Omco, Inc., Holden, Mass.

[21] Appl. No.: 298,294

[22] Filed: Sep. 1, 1981

Related U.S. Application Data

[63] Continuation of Ser. No. 102,925, Dec. 12, 1979, abandoned.

[51] Int. Cl.[3] .......... B23P 19/04

[52] U.S. Cl. .......... 29/265

[58] Field of Search .......... 29/256, 258, 259–265, 29/282

[56] References Cited

U.S. PATENT DOCUMENTS

| | | | |
|---|---|---|---|
| 309,206 | 12/1884 | Cushman | 279/68 |
| 1,155,720 | 10/1915 | Golly | 29/265 |
| 3,574,915 | 4/1971 | Jeal | 29/256 |
| 3,584,365 | 1/1971 | Cuen et al. | 29/256 |
| 3,647,232 | 3/1972 | Anderson | 279/68 |

FOREIGN PATENT DOCUMENTS

| | | | |
|---|---|---|---|
| 22682 | of 1907 | United Kingdom | 29/265 |
| 892177 | 3/1962 | United Kingdom | 29/256 |

*Primary Examiner*—Robert C. Watson

*Attorney, Agent, or Firm*—Thompson, Birch, Gauthier & Samuels

[57] ABSTRACT

A bolt type lock puller for removing jammed bolt type locks from lock housings. This lock puller is necessary to correct situations in which a thief has tried to open a bolt type lock by driving a nail into the keyhole. The lock is usually distorted by the nail and jams in the locked position. Therefore, the lock cannot be removed by the security key. The lock puller utilizes split jaws with opposed teeth which clamp around the head of the lock. A longitudinally extending stud is drawn axially to cause the split jaws to pull the clamped lock out of the lock housing.

3 Claims, 13 Drawing Figures

76
78
80
42
46
44
48
40
66
62
38
34
36
58
52
60
68
64
62
70
56
54
72
28
24
32
50

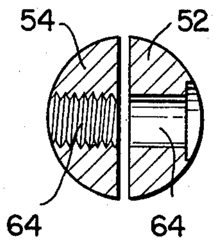
Fig. 6
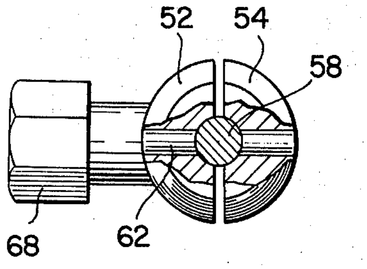
Fig. 5
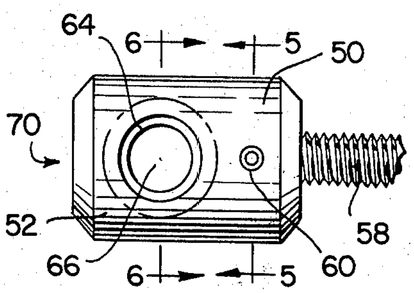
Fig. 4
Fig. 9
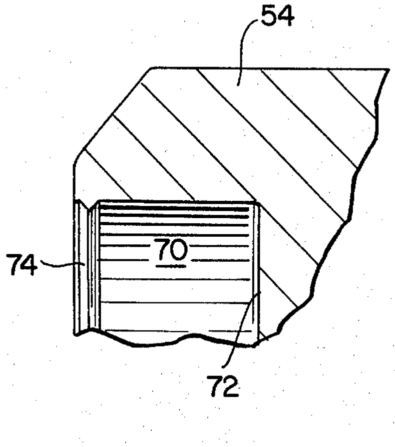
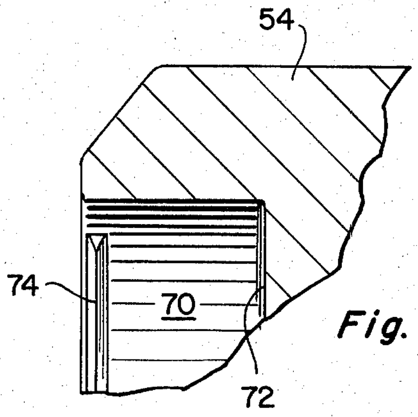
Fig. 10
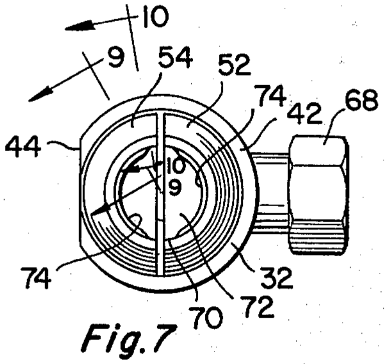
Fig. 7
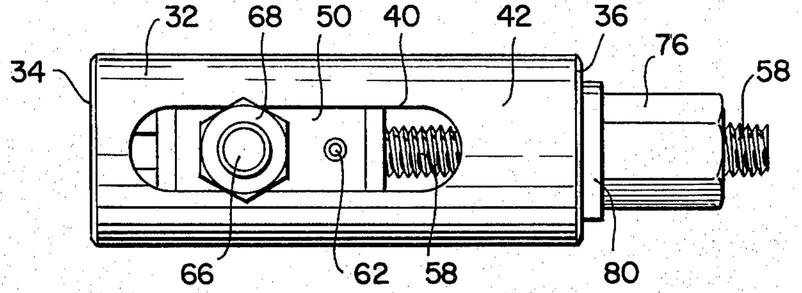
Fig. 8

BOLT TYPE LOCK PULLER

This is a continuation of application Ser. No. 102,925, filed Dec. 12, 1979, now abandoned.

BACKGROUND OF THE INVENTION

Bolt type locks have proven quite useful for securing electric meters and the like against break-ins by thieves. Because of the rapidly rising cost of energy, there has been an increasing wave of thefts of electricity, gas, etc. by thieves who break into the meters in order to bypass them.

The most common way for a thief to attempt to unlock a bolt type lock in order to break into a meter is to drive a nail into the keyhole. The thief hopes the nail will act like a security key and release the lock's extended locking balls so that the lock can be withdrawn from the lock housing and the meter can be entered. Unfortunately for both the thief and the utility company, the nail usually does not unlock the bolt type lock, and the nail frequently damages the lock interior so that the security key can no longer open the lock. When the lock is jammed in this fashion, it must be removed so that the utility company can have authorized access to the meter.

In order to pull a jammed lock out of its lock housing, applicant has invented a lock puller which is strong enough to accomplish its intended purpose, simple and easy to operate with a wrench, and inexpensive to fabricate.

SUMMARY OF THE INVENTION

The bolt type lock puller has a hollow sleeve with an open leading end. An extract axially reciprocates within the sleeve. The extractor has split jaws with opposed teeth at its leading end which are adapted to be releasably clamped around the head of a jammed bolt type lock. A transverse stud/nut assembly engaging the split jaws can be operated with a wrench to clamp or release the head of the lock. A longitudinal stud/nut assembly extending through the end of the hollow sleeve and engaging the extractor can be operated with a wrench to pull the lock out of the lock housing.

DESCRIPTION OF THE DRAWINGS

FIG. 4 is a side elevation of the extractor. A portion of the longitudinal stud extends from the trailing end of the extract.

FIG. 5 is a view in section of FIG. 4 taken along line 5—5.

FIG. 6 is a view in section of FIG. 4 taken along line 6—6.

FIG. 7 is an end elevation of the extractor. The view is looking towards the leading end of the extractor.

FIG. 8 is a side elevation of the lock puller shown in FIG. 1.

FIG. 9 is a view in section of FIG. 7 taken along line 9—9. The view is considerably enlarged and partially broken away.

FIG. 10 is a view in section of FIG. 7 taken along line 10—10. The view is considerably enlarged and partially broken away.

DESCRIPTION OF THE PREFERRED EMBODIMENT

Figure 12:
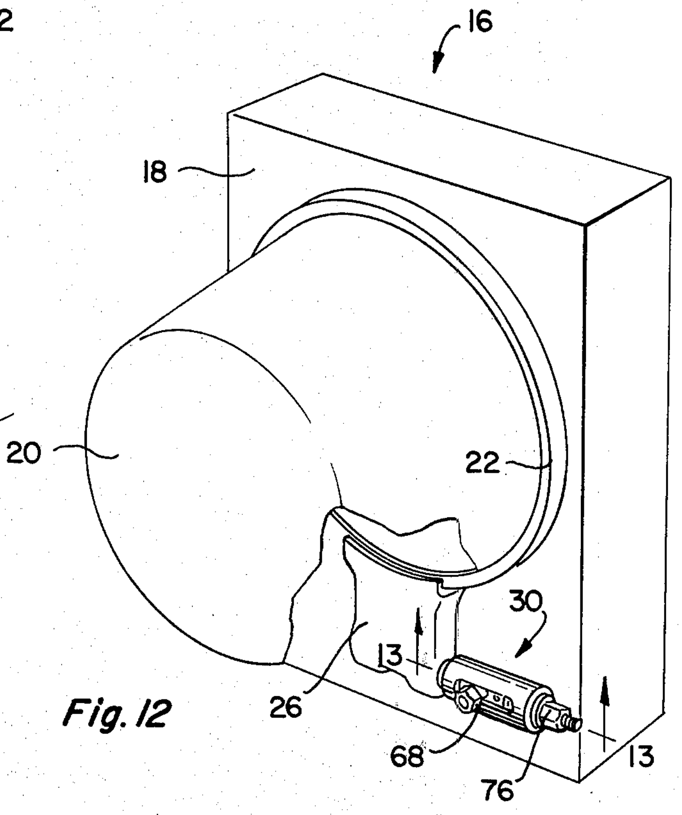
FIG. 12 is a perspective view of an electric meter housing. The characteristic glass cover has been locked to the metal box by the combination of a circular split ring, a lock housing, and a bolt type lock. The lock puller of this invention is shown prior to being clamped to the head of the lock and prior to being operated to pull the lock out of the lock housing.

FIG. 12 shows an electric meter box 16 which houses an electric meter (not shown). The box has a flat front panel 18, with a central aperture, and a glass bowl 20. The glass bowl is clamped to the front panel 18 by a circular split ring 22 which has two downwardly extending parallel ring tips (not shown) that are locked together by a bolt type lock 24. A lock housing 26 covers almost all of the lock 24. A portion of the head 28 of the lock 24 is not covered by lock housing 26. The uncovered portion of the head 28 contains the keyhole. The foregoing description is of an entirely conventional locked electric meter box.

When a thief drives a nail into the lock's keyhole with the result that the lock mechanism becomes jammed in the locked position, it is necessary for authorized utility personnel to forceably rip the lock from the housing in order to open the meter box. This ripping is accomplished by use of a lock puller 30 which is placed against the front panel 18 of box 16. The lock puller 30 clamps onto the head 28 of lock 24, and pulls the lock out of lock housing 26.

Lock puller 30 is clearly shown in FIGS. 1–3 and 8. It consists of a hollow sleeve 32 which has an open leading end 34 and a closed trailing end 36. A smooth walled hole is formed in the center of trailing end 36. The interior wall 38 of sleeve 32 is cylindrical. The sleeve 32 has a longitudinally extending slot 40 cut in the first side 42 of the sleeve. The sleeve also has a reduced or truncated portion 44 formed on its second or opposite side 46 of the sleeve. A second longitudinally extending slot 48 is formed in second side 46 as a result of the truncation and has no functional purpose.

The reduced portion 44 of the sleeve is flat and is located at a transverse distance from the axis of the sleeve that is selected to be approximately equal to (but no greater than) the distance from the meter box front panel 18 to the axis of the bolt type lock head 28. Thus, reduced portion 44 of lock puller 30 is designed to be placed flush against meter box front panel 18 in order to support and stabilize the lock puller during its operation.

An extractor 50, made of heat treated tool steel, is slidably mounted within hollow sleeve 32 for axial reciprocation. The extractor 50 is substantially cylindrical and includes two split jaws. First split jaw 52 is positioned adjacent to first side 42 of the sleeve, and second split jaw 54 is positioned adjacent to second side 46 of the sleeve. As shown in FIG. 7, the jaws are designed to be slightly spaced apart. Each jaw has a substantially semi-conductor axial bore 56 formed in its trailing end. Bore 56 has tapped internal threads sized to receive longitudinal threaded stud 58. Bore 56 also has a transverse drilled hole 60 to receive a transverse pin 62. The pin is driven through stud 58 and prevents both relative rotation and axial movement between the stud and the jaws. However, the pin does permit a small amount of transverse lateral play between the jaws. Because the stud 58 and the jaws 52 and 54 are pinned together, it is not absolutely necessary for bore 56 to be internally threaded. However, because large axial forces are generated during the operation of the lock puller, it is highly desirable to have the greatly increased bearing surface area which is provided by the interaction between the internal threads in bore 56 and the external threads on stud 58.

The extractor body also has a second and larger transverse hole 64 formed through its two split jaws 52 and 54. Second hole 64 is located forward of pin hole 60 and preferably extends parallel to it. First split jaw 52 has a smooth walled hole 64 with a counterbored opening in the convex surface of first split jaw 52 (see FIGS. 3, 4 and 6). Second split jaw 54 has an internally threaded hole 64 with a reduced diameter opening in the convex surface of second split jaw 54.

A transverse threaded stud 66 is dimensioned to freely pass through the smooth walled hole 64 in first jaw 52, and to threadably and tightly engage in the internally threaded hole 64 in second jaw 54. Stud 66 bottoms on and cannot pass out through the reduced diameter bottom of the hole 64 in second jaw 54.

Figure 13:
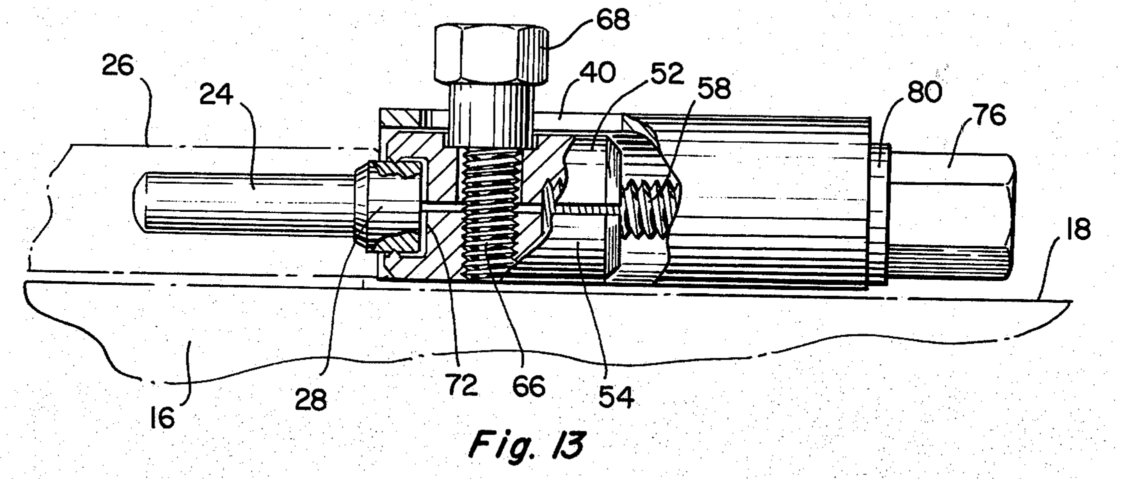
FIG. 13 is a bottom plan view of the lock puller shown in FIG. 8. The bolt type lock is shown clamped by the teeth in the split jaws. The sleeve and the extractor are both partially broken away.

A nut 68 is threadably engaged over the trailing end of transverse stud 66. The nut 68 has a leading end which is shaped to enter into and to bear against the counterbored portion of hole 64 in first jaw 52 (see FIG. 13). The nut is open at both of its ends. The transverse stud 66 is intended to be driven tightly into the bottom of hole 64 in second jaw 54 and to remain fixed therein. The nut 68 is intended to remain against the counterbored portion of first split jaw 52. Thus, as nut 68 is turned (by a wrench), the transverse stud 66 does not revolve, and the second split jaw 54 is drawn towards the first split jaw 52. The diameter and length of the exterior of nut 68 is such that its cylindrical leading portion is narrower than and extends through longitudinal slot 40 in sleeve 32, whereas its hexagonal headed portion is wider than and remains beyond slot 40.

The extractor body 50 has cylindrical walls forming a concave mouth 70 in its leading end. The mouth 70 has a flat back wall 72 (although the shape of the back wall can vary). The mouth 70 has two teeth 74 formed on the two cylindrical walls 70. One tooth is on first split jaw 52 and the other tooth is on second split jaw 54. The teeth 74 are positioned in opposition to each other and are located and aligned so that they bite directly towards each other as the turning of nut 68 pulls second split jaw 54 towards first split jaw 52.

Preferably, teeth 74 have a V-shaped cross-section (the vee is approximately 60°) and each tooth extends over an arc of approximately 110°. However, the teeth could have other cross-sectional shapes which are suitable for biting into the lock head 28. Also, each tooth could extend over an arc ranging from about 20° to about 160°. The preferred tooth arc of about 110° maximizes the extractor's biting power and minimizes the extractor's clearance problems which occur during opening and closing of the split jaws.

Furthermore, instead of one row of V-shaped teeth, there could alternatively be multiple rows of teeth. However, the teeth must be capable of biting into and securely holding the head of the lock when the split jaws are drawn together by the action of nut 68. Considerable experimentation has shown that the optimal shape, size, extent, and location of the teeth in extractor mouth 70 are as they are shown in the attached drawings.

The longitudinal threaded stud 58 is dimensioned to freely pass through the smooth walled hole in the center of trailing end 36 of sleeve 32. The stud is threadably engaged in the axial bore 56 of extractor 50 and is also pinned to the extractor by transverse pin 62. Thus, longitudinal stud 58 is fixed to the extractor, and the stud and the extractor move as a single element.

Figures 1, 2, 3:
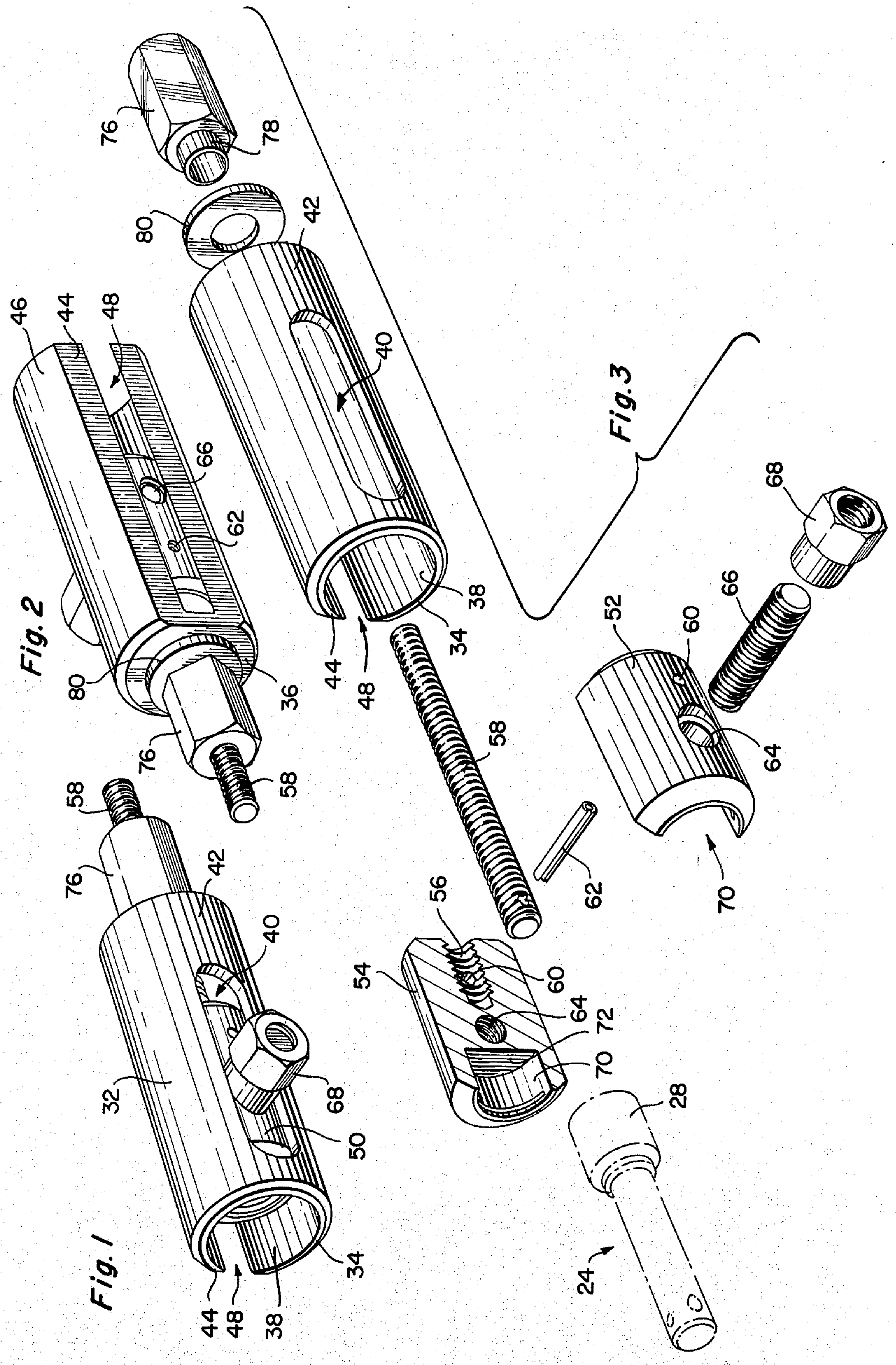
FIG. 1 is a perspective view of the preferred embodiment of the lock puller of this invention. The view is looking towards the first side of the sleeve.
FIG. 2 is a perspective view of the other side of the lock puller shown in FIG. 1. The view is looking towards the second side of the sleeve.
FIG. 3 is an exploded perspective view of the lock puller shown in FIG. 1. A bolt type lock is shown on the left side of this view.
Figure 11:
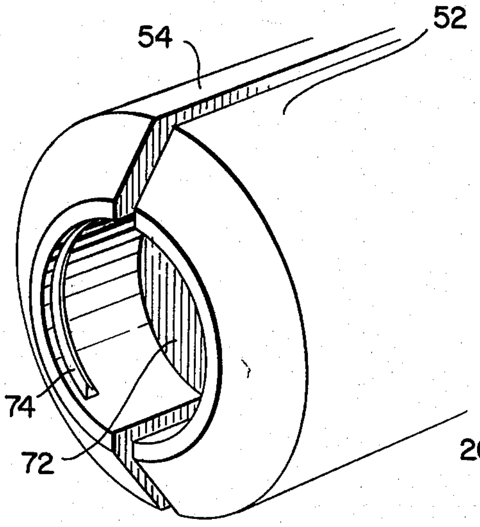
FIG. 11 is a perspective view of the leading end of the extractor.

A nut 76 has a forwardly extending tubular portion 78 (see FIG. 3). A washer 80 is press-fitted over tubular portion 78 and is fixed thereto. The tubular portion of the nut is inserted into the central hole in trailing end 36 of sleeve 32. Then, the leading end of the tubular portion 78 is punched from within the sleeve to cause the leading end of the nut to become conical and to rotatably retain the nut 76 in the central hole of the sleeve.

Nut 76 threadably engages stud 58. As nut 76 is turned (by a wrench), the longitudinal stud does not revolve, and the extractor is moved axially within hollow sleeve 32. The extractor can be moved forward until nut 68 strikes the forward end of slot 40. The extractor can be moved backward until nut 68 strikes the rear end of slot 40.

In operation, when an authorized utility installer observes that a bolt type lock has become jammed in the lock housing, he loosens nut 68 to relax the split jaws 52 and 54, and then turns nut 76 to move the relaxed split jaws as far as they can move towards the leading end of sleeve 32. Then, he horizontally places the lock puller against the front panel of the meter box so that the flat reduced portion 44 of the sleeve is positioned against the flat front panel. The split jaws are then slipped over the head 28 of lock 24, and nut 68 is tightened with a wrench. This tightening action causes opposing teeth 74 to bite deeply into the head of the lock. Then, nut 76 is turned with a wrench to pull extractor 50 (and lock 24) rearwardly into the sleeve while the leading end 34 of the sleeve bears against the lock housing 26. The pulling action causes the lock to rip through the lock housing interior and exterior. The lock and the housing are then discarded and replaced with substitutes.

The foregoing description and drawings are intended solely to illustrate a preferred embodiment of this invention. There are many obvious modifications which could be made by one skilled in the art without departing from the spirit of this invention. Only the claims define and limit the scope of this invention.

I claim:

1. A bolt type lock puller comprising:

(a) a hollow sleeve having an open leading end and a closed trailing end in which an axially centered circular aperture is provided;

(b) an extractor mounted to axially reciprocate within said sleeve, said extractor having split jaws at its leading end, said jaws being split along an axial plane, said jaws fixed against relative rotational and axial movement with respect to each other, said jaws mounted for limited relative movement solely in a transverse direction towards and away from each other;

(c) said extractor split jaws having opposed teeth positioned to clamp around a cylindrical object;

(d) means for releasably closing said split jaws by transversely moving said jaws towards each other in a direction normal to the axis of said sleeve, said jaw closing means causing said jaws to bite into and tightly grip the head of a bolt type lock; and (e) means for reciprocating said extractor relative to said sleeve to pull a tightly gripped bolt type lock into said sleeve, said reciprocating means including a longitudinal stud affixed to said extractor and extending through said sleeve trailing end aperture, said longitudinal stud adapted to be acted upon to axially move said extractor within said sleeve, said longitudinal stud being externally threaded, each said split jaw being formed with a substantially semi-circular axial bore, each said bore having internal threads sized to receive said externally threaded stud, said split jaws constrained for limited transverse movement and fixed against axial movement relative to said longitudinal stud, said reciprocating means being entirely separate from and operating independently of said jaw closing means;

(f) said closing means moving said jaws solely in the transverse direction, and said reciprocating means moving said jaws solely in the axial direction.

2. A bolt type lock puller comprising:

(a) a hollow sleeve having an open leading end and a closed trailing end in which an axially centered circular aperture is provided, said sleeve having a longitudinally extending slot provided therein;

(b) an extractor mounted to axially reciprocate within said sleeve, said extractor having two split jaws at its leading end, said jaws constrained for limited transverse movement relative to each other;

(c) said extractor jaws having opposed teeth positioned to clamp around a cylindrical object, each said tooth extending over an arc of between 60° and 150° on each said jaw;

(d) means for releasably closing said split jaws to bite into and tightly grip the head of a bolt type lock by transversely moving said jaws towards each other, said jaw closing means including a transverse stud affixed to one said jaw and extending through the other said jaw, said transverse stud adapted to be acted upon to transversely move said two jaws towards each other, one said jaw fixed against movement relative to said transverse stud and the other said jaw constrained for limited transverse movement relative to said transverse stud, said transverse stud extending through and sliding along said longitudinally extending sleeve slot; and (e) means for reciprocating said extractor relative to said sleeve to pull a tightly gripped bolt type lock into said sleeve, said extractor reciprocating means including a longitudinal stud affixed to said extractor and extending through said sleeve trailing end aperture, said longitudinal stud being provided with first engagement means and said jaws being provided with second engagement means, said first engagement means in mating engagement with said second engagement means, said jaws constrained for limited transverse movement and fixed against axial movement relative to said longitudinal stud, said longitudinal stud adapted to be acted upon to axially move said extractor within said sleeve, said first engagement means including external threads provided on said longitudinal stud and said second engagement means including internal threads provided in a bore formed in said jaws, said external threads sized to be locked in mating engagement with said internal threads.

3. A bolt type lock puller comprising:

(a) a hollow sleeve having an open leading end;

(b) an extractor mounted to axially reciprocate within said sleeve, said extractor having split jaws at its leading end, said jaws being split along an axial plane, said jaws fixed against relative rotational and axial movement with respect to each other, said jaws mounted for limited relative movement solely in a transverse direction towards and away from each other;

(c) said extractor split jaws having opposed teeth positioned to grip a cylindrical object;

(d) means for releasably closing said split jaws by transversely moving said jaws towards each other in a direction normal to the axis of said sleeve, said jaw closing means causing said jaws to bite into and tightly grip the head of a bolt type lock; and (e) means for reciprocating said extractor relative to said sleeve to pull a tightly gripped bolt type lock into said sleeve, said reciprocating means including a longitudinal stud in mating engagement with said jaws, said longitudinal stud provided with first engagement means and each said jaw provided with second engagement means, said first engagement means in mating engagement with said second engagement means, said first engagement means including external threads provided on said longitudinal stud and said second engagement means including internal threads provided in a bore formed in said jaws, said external threads sized to be locked in mating engagement with said internal threads, said longitudinal stud and said jaws fixed against relative axial movement with respect to each other, said reciprocating means being entirely separate from and operating independently of said jaw closing means;

(f) said closing means moving said jaws solely in the transverse direction, and said reciprocating means moving said jaws solely in the axial direction.

* * * * *